United States Patent
MacDonald

(10) Patent No.: US 10,192,104 B2
(45) Date of Patent: Jan. 29, 2019

(54) SYSTEMS AND METHODS FOR AUTHENTICATING A USER BASED ON CAPTURED IMAGE DATA

(71) Applicant: Capital One Services, LLC, McLean, VA (US)

(72) Inventor: Colin Robert MacDonald, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/789,669

(22) Filed: Oct. 20, 2017

(65) Prior Publication Data

US 2018/0089503 A1 Mar. 29, 2018

Related U.S. Application Data

(63) Continuation of application No. 15/153,218, filed on May 12, 2016, now Pat. No. 9,842,250.

(60) Provisional application No. 62/160,897, filed on May 13, 2015.

(51) Int. Cl.
*G06K 9/00* (2006.01)
*G06F 21/32* (2013.01)
*G06F 21/31* (2013.01)

(52) U.S. Cl.
CPC ....... *G06K 9/00335* (2013.01); *G06F 21/316* (2013.01); *G06F 21/32* (2013.01); *G06K 9/00892* (2013.01)

(58) Field of Classification Search
None
See application file for complete search history.

(56) References Cited

U.S. PATENT DOCUMENTS

| 8,457,367 B1 * | 6/2013 | Sipe | G06K 9/00221 382/118 |
| 2010/0205667 A1 | 8/2010 | Anderson et al. | |
| 2013/0265218 A1 * | 10/2013 | Moscarillo | G06F 3/017 345/156 |

FOREIGN PATENT DOCUMENTS

| EP | 2680192 A2 | 1/2014 | |
| EP | 2960828 A1 * | 12/2015 | G06K 9/00315 |

OTHER PUBLICATIONS

Extended European Search Report dated Nov. 27, 2018 for European Patent Application No. 3295353 (10 pages).

* cited by examiner

*Primary Examiner* — Delomia L Gilliard
(74) *Attorney, Agent, or Firm* — Finnegan, Henderson, Farabow, Garrett & Dunner, LLP

(57) ABSTRACT

Systems and methods are provided for authenticating a user of a computing device. The system comprises one or more memory devices storing instructions, and one or more processors configured to execute the instructions to provide, to a computing device associated with a user, an indication of a prescribed authentication parameter. The system also receives image data including an image of the user of the computing device captured using an image sensor of the computing device. The system determines an identity of the user based on an analysis of the received image data, determines whether the received image data includes a feature corresponding to the prescribed authentication parameter, and authenticates the user based at least in part on whether the received image data includes the feature corresponding to the prescribed authentication parameter.

18 Claims, 8 Drawing Sheets

SYSTEMS AND METHODS FOR AUTHENTICATING A USER BASED ON CAPTURED IMAGE DATA

PRIORITY CLAIM

This is a continuation of U.S. patent application Ser. No. 15/153,218, filed on May 12, 2016, which claims priority to U.S. provisional patent application No. 62/160,897, filed on May 13, 2015, titled "Systems and Methods for Authenticating a User Based on Captured Image Data." The aforementioned applications are incorporated herein by reference in their entireties.

TECHNICAL FIELD

The disclosed embodiments generally relate to systems and methods for authenticating a user and, more particularly, systems and methods for authenticating a user based on a real-time image of the user performing a gesture or other action satisfying an authentication parameter.

BACKGROUND

Mobile computing devices provide many conveniences to a user. For example, a user may operate a properly configured mobile computing device to conduct or engage in certain mobile or online banking activities that otherwise traditionally required the user to be physically present at a banking location. But while users may now remotely perform some banking activities using a mobile-device, some transactions or other activities continue to require in-person authentication at a banking location. These limitations on remote and mobile banking are due at least in part to concerns surrounding the security of the transactions and the ability to verify the identity or authenticity of the user. Some mobile device applications, and authentication systems generally, use password or other biometric authentication information to authenticate a user of the device. These techniques, however, include considerable drawbacks. For example, passwords, shared secrets, and biometric information are discoverable and/or replicable and, thus, remain susceptible to fraudulent activities. Additionally, during an authentication instance, known authentication techniques lack measures to ensure the protected authentication information is actually received in real-time or substantially real-time from the person to be authenticated Thus, known authentication techniques allow authentication information to become used for fraudulent activity regardless of when the authentication information was fraudulently obtained.

Thus, there is a need for systems and methods providing advanced authentication techniques. In particular, there is a need for systems and methods for remotely authenticating a person that overcome drawbacks of current authentication techniques including, among others, the drawbacks described above.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides systems and methods for authenticating a person. In particular, systems and methods for remotely authenticating a user of a computing device based on information identifying the user and a prescribed authentication parameter. Additional aspects of the disclosed embodiments are set forth below in this disclosure.

The disclosed embodiments include a system for authenticating a user of a computing device. The system comprises one or more memory devices storing instructions, and one or more processors configured to execute the instructions to provide, to a computing device associated with a user, an indication of a prescribed authentication parameter. The system also receives image data including an image of the user of the computing device captured using an image sensor of the computing device. The system determines an identity of the user based on an analysis of the received image data, determines whether the received image data includes a feature corresponding to the prescribed authentication parameter, and authenticates the user based at least in part on whether the received image data includes the feature corresponding to the prescribed authentication parameter.

The disclosed embodiments also include a device operated by a user. The device comprises one or more memory devices storing instructions, and one or more processors configured to execute the instructions to provide, on a display of the device, an indication of a prescribed authentication parameter. The device also receives a selection via an interface of the device, from a user operating the device, to initiate an image capture operation. The device also activates an image capture module in response to the selection, wherein the image capture module is configured to control an image capture device associated with the device. The device also captures image data of the user via the image capture device, transmits at least a portion of the captured image data to an authentication system, and receives indication of an authentication decision from the authentication system, wherein the authentication decision is based at least in part on whether the received image data identifies the user and includes a feature corresponding to the prescribed authentication parameter.

The disclosed embodiments include a computer-implemented method for authenticating a user of a computing device, wherein the method is performed by one or more processors. The method comprises providing, to a computing device, an indication of a prescribed authentication parameter. The method also includes receiving image data including an image of a user of the computing device captured using an image sensor of the computing device. The method further includes determining an identity of the user based on an analysis of the received image data and determining whether the received image data includes a feature corresponding to the prescribed authentication parameter. The method also includes authenticating the user based at least in part on whether the received image data includes the feature corresponding to the prescribed authentication parameter.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
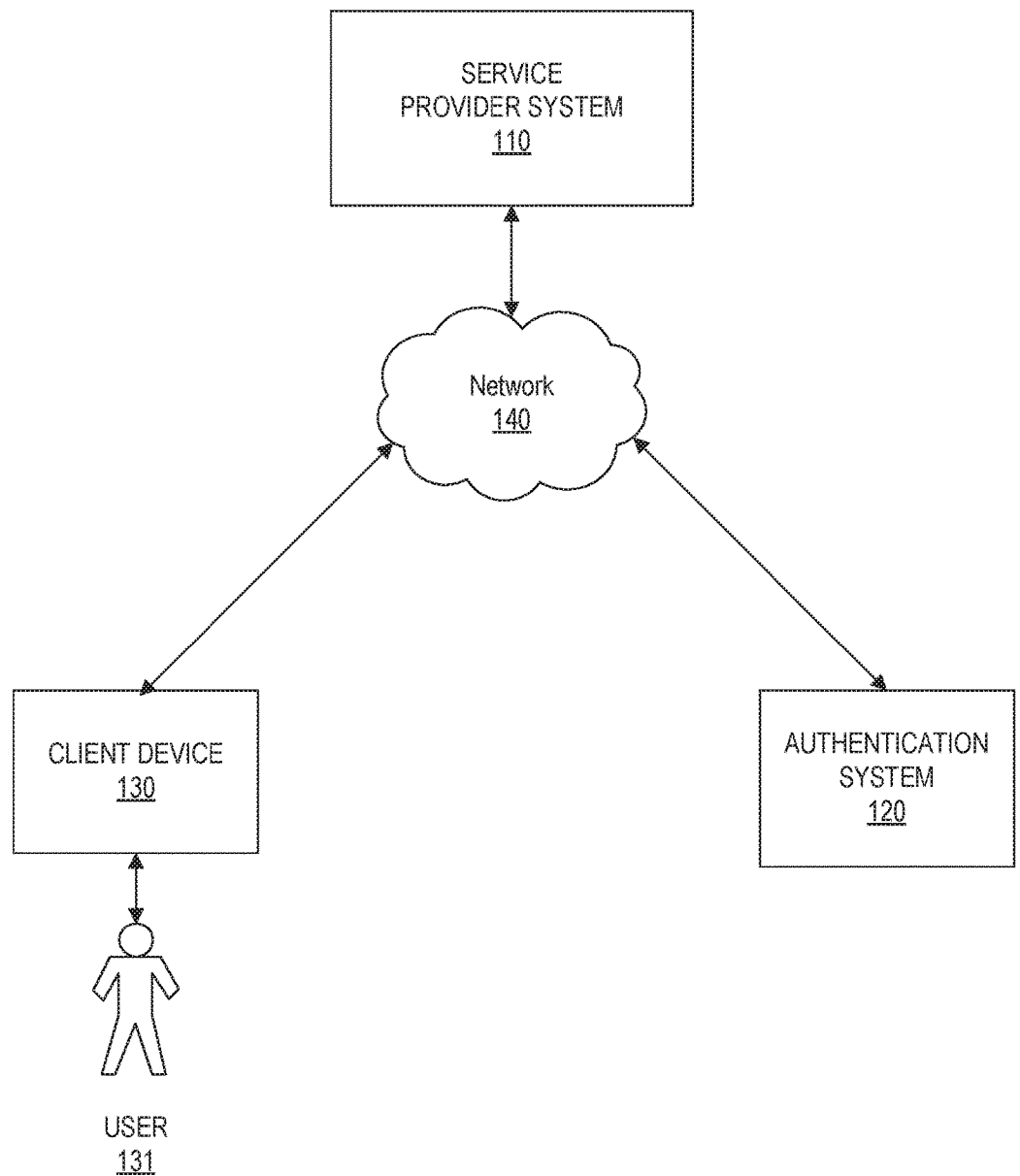
FIG. 1 is a block diagram of an exemplary system, consistent with the disclosed embodiments.

Reference will now be made in detail to exemplary embodiments, examples of which are illustrated in the accompanying drawings and disclosed herein. Wherever convenient, the same reference numbers will be used throughout the drawings to refer to the same or like parts.

The present disclosure describes advanced systems and methods for authenticating a person based on a real-time gesture of a person captured in image data. The disclosed authentication systems and methods are based on a multi-factor authentication method using, for example, biometric information and at least one gesture dynamically performed in real-time. In some embodiments, the biometric information may include facial recognition information. In other embodiments, the biometric information may include information generated from a retinal scan or an iris scan, as well as a fingerprint or some other uniquely identifiable trait or characteristic of a person. In some embodiments, a gesture dynamically performed in real-time may include a formation of a hand, such as in a fist or with fingers spread apart, or one or more fingers formed in a recognizable formation. Additionally, a gesture of the disclosed embodiments may include a particular use of the hand to point to or interact with a facial feature, such as to pull on one's ear, touch the chin, etc. The number and variety of potential gestures are many. Additional examples are discussed below.

An exemplary authentication method may include a positive identification of a person in captured image data based on, for example, facial recognition or some other uniquely identifying biometric information or combination of biometric information, as well as a positive identification of a contemporaneous gesture performed by the person captured in the image data. In some embodiments, the gesture may be prescribed particular to an authentication instance, and otherwise has no pre-established relationship with the person. Thus, the prescribed gesture particular to an authentication instance may be unpredictable to the person to be authenticated and, thus, a third-party with fraudulent intentions. The disclosed embodiments may thus enable an authentication system to not only verify an identity of a person in captured image data but also verify the person's involvement in providing the image data.

The disclosed embodiments may overcome drawbacks in conventional systems described herein, among others, because the biometric authentication scheme is tied to a dynamic authentication technique that cannot be easily replicated. For example, even if a captured image of a person's face or fingerprint may be replicated or copied, the images used for authentication in the disclosed embodiments include an unpredictable real-time authentication parameter that may not be replicated in sufficient time to be used for a given authentication request instance.

In some embodiments, the disclosed authentication methods may be implemented using a mobile device such as a smartphone, tablet, or other device having image capture capability. The authentication methods may be performed in response to, or as part of, a request to perform a mobile or remote transaction with a financial service provider or a merchant, or for any purpose requiring authentication of a person. The disclosed authentication methods may generally include a contemporaneous determination of at least one authentication gesture to be performed by the person seeking authentication. The authentication gesture to be performed may be randomly selected from a database of possible gestures. The disclosed methods may include capturing image data of the person performing the prescribed authentication gesture. In some embodiments, a person or user of the mobile device may capture the image data of himself using the mobile device while performing the prescribed authentication gesture. The disclosed authentication methods, however, may be implemented by any system capable of capturing image data of a person such as, for example, a building security system, an ATM, a remote desktop computer, or any other similar system that may include a camera for capturing image data of a person and a need for authenticating the person.

The following disclosure provides exemplary systems and methods for improving remote authentication of a person based in part on identification of the person and identification of a prescribed authentication gesture in real-time image data.

FIG. 1 is a block diagram of an exemplary system 100 for performing one or more operations consistent with the disclosed embodiments. In some embodiments, system 100 may include one or more service provider systems 110, one or more authentication systems 120, one or more client devices 130, one or more users 131, and a network 140, Components of system 100 may be configured to provide authentication methods according to the disclosed embodiments.

In some embodiments, the disclosed authentication methods are used to authenticate user 131 operating a client device 130. Client device 130 may be a desktop computer, laptop, tablet, smartphone, multifunctional watch, pair of multifunctional glasses, tracking device, or any suitable device with computing capability. In some embodiments, client device 130 may be a computing device that is not operated by user 131, but is part of a system, such as a building security system or an automated teller machine (ATM), for example, associated with a third-party. In some embodiments client device 130 includes an image capture device for capturing real-time image data of a person (user 131) to be authenticated. An image capture device may be incorporated into client device 130 or otherwise in communication with client device 130. Client device 130 may also include executable software instructions for performing certain aspects of the disclosed methods. In some embodiments, client device 130 includes executable software instructions provided as part of an application or app associated with a service provider, such as, for example, a financial service provider for performing operations associated with a financial service account. In some embodiments, the disclosed authentication methods may be performed in association with the financial service application. Client device 130 is discussed in additional detail with respect to FIG. 3, below.

As further described herein, the disclosed authentication methods may be used to authenticate user 131 operating client device 130 in response to a request to perform a transaction with a financial service provider or access sensitive information, or for any purpose requiring authentication of a user. In some embodiments, the disclosed authentication methods may be implemented by a service provider system 110. Service provider system 110 may be associated with any service providing entity, including a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, service provider system 110 may be enabled to implement the disclosed authentication methods to remotely authenticate a person associated with a financial service account, for example.

The disclosed embodiments are not limited to authentication by a financial service provider. Rather, disclosed systems and methods may be implemented by any entity with a need or purpose to authenticate persons, regardless of industry. For ease of discussion, in some embodiments, the disclosed authentication methods may be described as implemented by an authentication system 120, which may be independent of or associated with one or more service provider systems 110, merchant systems (not shown), or a plurality of other entity systems (not shown) associated with system 100. In some embodiments, authentication system 120 may be associated with a third-party authentication service entity that provides remote, mobile, or other network or computing system security and authentication services.

Service provider system 110 and authentication system 120 may include one or more computing devices (e.g., computer(s), server(s), etc.), memory storing data and/or software instructions (e.g., database(s), memory devices, etc.), and other known computing components configured to perform the disclosed authentication methods. As described in further detail below with respect to FIG. 2, in some embodiments, the one or more computing devices may include one or more processors configured to execute software instructions stored on one or more memory devices to perform one or more authentication methods or other operations consistent with the disclosed embodiments. In certain aspects, users may operate one or more components of system 100 to receive communications, initiate operations, and/or provide input for one or more operations consistent with the disclosed embodiments. The disclosed embodiments are not limited to any particular configuration of service provider system 110, authentication system 120 or system 100.

Service provider system 110, authentication system 120, and client device(s) 130 may be configured to communicate with each other and one or more other components of system 100 over a network 140 for performing the disclosed authentication methods. Network 140 may comprise any type of computer networking arrangement configured to provide communications or exchange data, or both, between components of system 100. For example, network 140 may include any type of network (including infrastructure) that provides communications, exchanges information, and/or facilitates the exchange of information, such as the Internet, a private data network, a virtual private network using a public network, a Wi-Fi network, a LAN or WAN network, and/or other suitable connections that may enable information exchange among various components of system 100. Network 140 may also include a public switched telephone network ("PSTN") and/or a wireless cellular network. Network 140 may be a secured network or unsecured network. In some embodiments, one or more components of system 100 may communicate directly through a dedicated communication link(s).

It is to be understood that the configuration of the functional building blocks of system 100 have been defined herein for the convenience of the description. The components and arrangement of the components included in system 100 may vary. For example, in some embodiments, service provider system 110 and authentication system 120 may be implemented together as part of a single system. Additionally, in some embodiments, system 100 may include other components that perform or assist in the performance of one or more processes consistent with the disclosed authentication methods. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
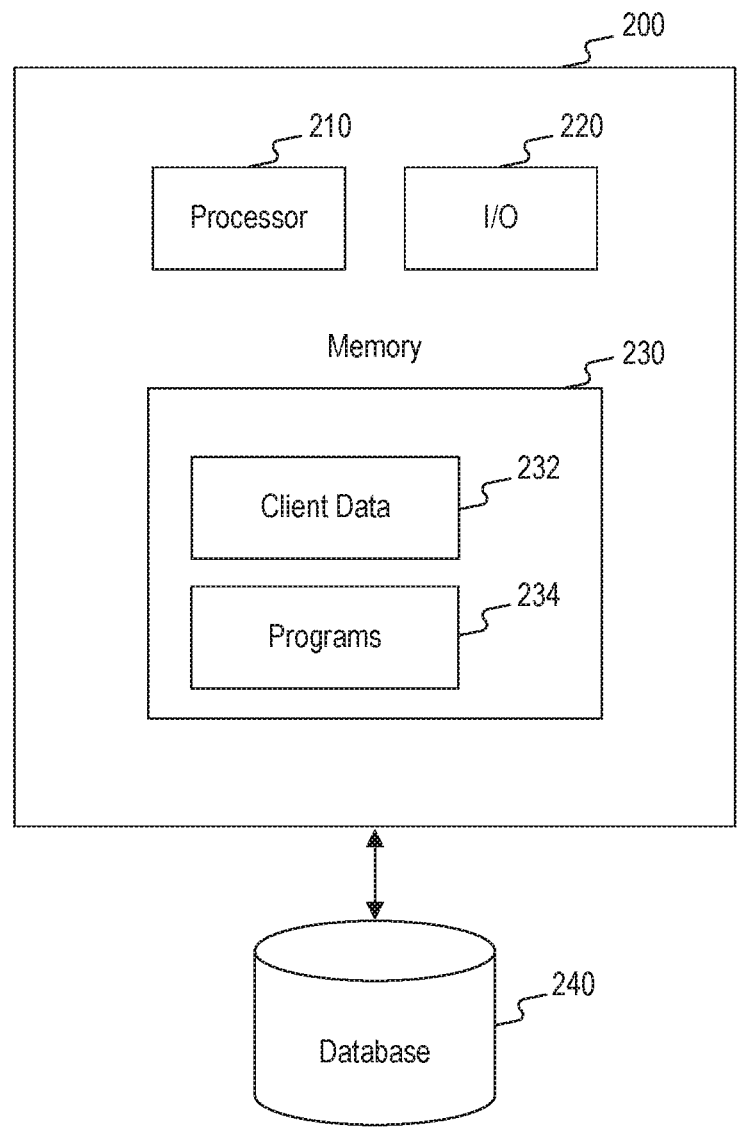
FIG. 2 is a block diagram of an exemplary computing system, consistent with the disclosed embodiments.

System 100 includes a number of components generally described as computing devices. Each of the computing devices may include any number of computing components particularly configured as a special purpose computing device to perform the functionality disclosed herein. FIG. 2 shows a diagram of an exemplary computing system 200 illustrating a computing system configuration that may be associated with service provider system 110, authentication system 120, or a client device 130, consistent with the disclosed embodiments.

FIG. 2 is a block diagram of an exemplary computing system 200 for performing certain aspects of the disclosed authentication methods. In one embodiment, computing system 200 may include one or more processors 210, one or more input/output (I/O) devices 220, and one or more memories 230. In some embodiments, computing system 200 may take the form of a server, special purpose computing device, a mainframe computer, laptop, smartphone, mobile device, ATM, security device, or any combination of these components. In certain embodiments, computing system 200 (or a system including computing system 200) may be configured as a particular apparatus, system, and the like based on the storage, execution, and/or implementation of the software instructions that perform one or more operations consistent with the disclosed embodiments. Computing system 200 may be standalone, or it may be part of a subsystem, which may be part of a larger system. Computing system 200 may be a single server or may be configured as a distributed computer system including multiple servers or computers that interoperate to perform one or more of the processes and functionalities associated with the disclosed embodiments. Further, although sometimes discussed here in relation to service provider system 110, it should be understood that variations of computing system 200 may be used by other components of system 100, including authentication system 120, and client device 130.

I/O devices 220 may be one or more devices configured to allow data to be received and/or transmitted by computing system 200. I/O devices 220 may include one or more digital and/or analog communication devices that allow computing system 200 to communicate with other machines and devices, such as other components of system 100 shown in FIG. 1. Computing system 200 may also include interface components for one or more input devices, such as one or more keyboards, mouse devices, and the like, which may enable computing system 200 to receive input from an operator of service provider system 110 or authentication system 120 (not shown).

In some embodiments, such as when computing system 200 includes an ATM, or a building security system, for example, I/O devices 220 may include an image capture device such as a camera for capturing real-time image data. An exemplary image capture device may be capable of performing any operations of commonly known cameras including capturing a single frame image and/or a video image. An exemplary image capture device may also perform other functions such as autofocus, zoom, exposure control, etc. for capturing desirable image data. In some embodiments, an exemplary image capture device may be a network camera configured to communicate with other components of computing system 200 over network 140, for example.

Processor 210 may include one or more known processing devices, such as a microprocessor from the Pentium™ or Xeon™ family manufactured by Intel™, the Turion™ family manufactured by AMD™, or any of various processors manufactured by Sun Microsystems, for example. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual core, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor (s) configured in computing system 200.

Memory 230 may include one or more storage devices configured to store instructions executable by processor 210 to perform functions related to the disclosed embodiments. Memory 230 may be a volatile or non-volatile, magnetic, semiconductor (e.g., EEPROM, flash memory, etc.), tape, optical, removable, non-removable, or other type of storage device or tangible (i.e., non-transitory) computer-readable medium.

In some embodiments, memory 230 may be configured with one or more software instructions, such as one or more program(s) 234 that, when executed by processor 210, perform the disclosed authentication methods including operations related to facial feature recognition, authentication gesture recognition, or other functions. The disclosed embodiments are not limited to separate programs or computers configured to perform dedicated tasks. For example, memory 230 may include a program 234 that performs the functions of computing system 200, or program 234 could comprise multiple programs. Additionally, processor 210 may execute one or more programs located remotely from computing system 200. For example, service provider system 110, authentication system 120, or client device 130, may, via computing system 200 (or variants thereof), access one or more remote programs that, when executed, perform functions related to certain disclosed embodiments. Processor 210 may further execute one or more programs located in database 240. In some embodiments, programs 234 may be stored in an external storage device, such as a cloud server located outside of computing system 200, and processor 210 may execute programs 234 remotely.

Memory 230 may also store data that may reflect any type of information in any format that the system may use to perform operations consistent with the disclosed embodiments. For example, in some embodiments, memory 230 may store data or other information corresponding to a plurality of authentication gestures to be prescribed to a person for an authentication instance. Memory 230 may also store data for identifying the prescribed gesture in received image data. Such information may include pre-stored images or representations of aspects or features of the gestures to be identified. Memory 230 may also store instructions to enable processor 210 to execute one or more applications, such as server applications, network communication processes, and any other type of application or software including software for performing operations associated with a financial service account. Alternatively, the instructions, application programs, etc., may be stored in an external storage (such as database 240) in communication with computing system 200 via network 140 or any other suitable network.

Memory 230 may further include client data 232, which may include information about particular clients of a financial service provider and/or authentication system 120. For example, client data 232 may include client account information including any information associated with a financial service account or other information associated with a client. Client data 232 may include a plurality of data used to identify the client based on image data. Such data may include a plurality of stored images or image data, or other related data for identifying a particular person based on analyzed image data, including data associated with facial features or other uniquely identifying information. In some embodiments, client data 232 may be stored in database 240, which may be an external storage device in communication with computing system 200 via network 140.

Computing system 200 may also contain one or more database(s) 240. Alternatively, computing system 200 may be communicatively connected to one or more database(s) 240. Computing system 200 may be communicatively connected to database(s) 240 through a direct connection and/or a network (e.g., network 140). Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. Database 240 may include computing components (e.g., database management system, database server, etc.) configured to receive and process requests for data stored in memory devices of database(s) 240 and to provide data from database 240.

In some embodiments, authentication system 120 may include the same or similar configuration and/or components of computing system 200. Computing system 200 when implemented in authentication system 120 may include any hardware and/or software installed therein necessary for performing methods and processes of the disclosed embodiments, such as for example, performing analysis on received image data to identify a particular person in the received image data and to identify a prescribed authentication gesture in the received image data. In some embodiments, certain aspects of the disclosed authentication methods may be performed by service provider system 110 and other aspects performed by authentication system 120. Additionally, in some embodiments, aspects of the disclosed authentication methods may also be performed by a client device 130 operated by a user 131.

Figure 3:
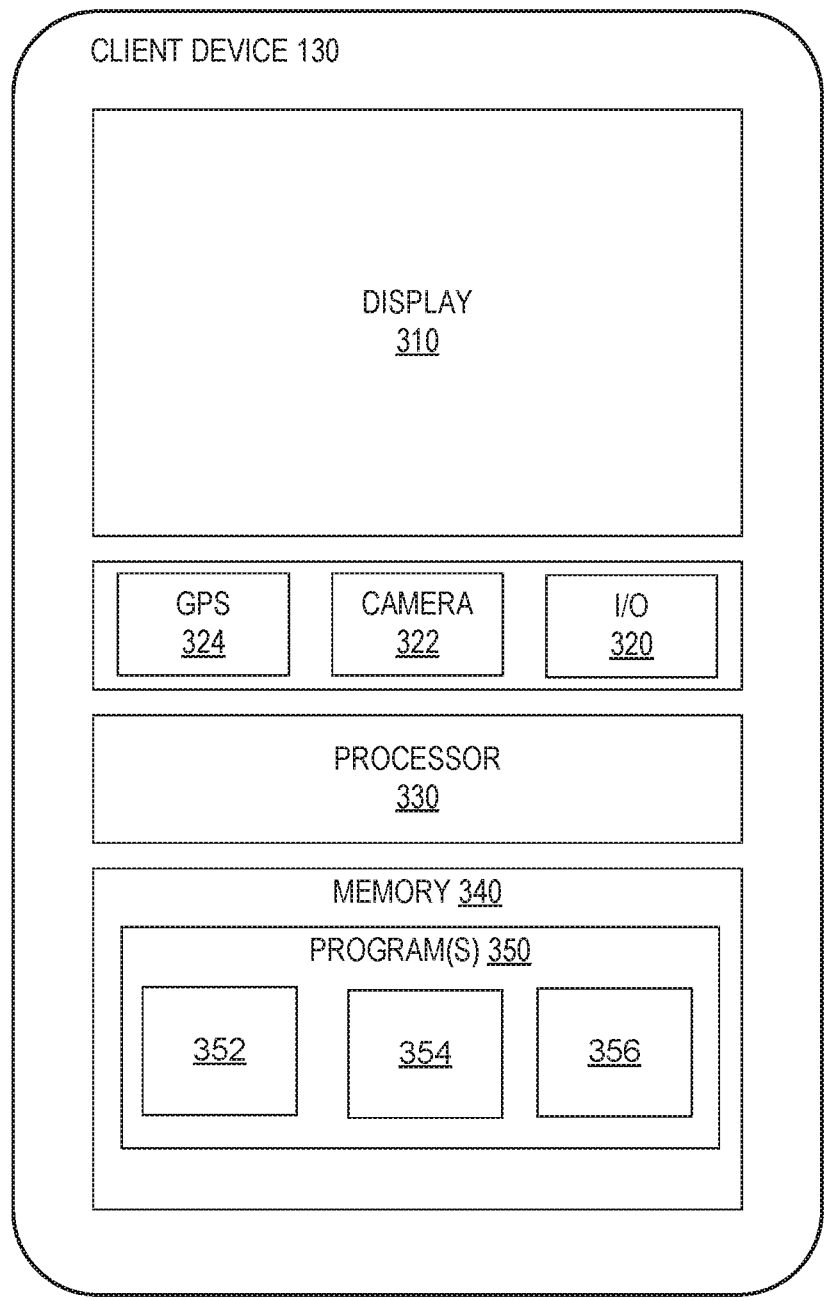
FIG. 3 is a block diagram of an exemplary client device, consistent with the disclosed embodiments.

FIG. 3 shows an exemplary configuration of client device 130, consistent with disclosed embodiments. Client device 130 may enable a user to operate client device 130 to perform remote or mobile transactions with service provider system 110, for example, or any other operations that may require remote authentication of user 131. In some embodiments, client device 130 may be a personal computing device. For example, client device 130 may be a smartphone, a laptop or notebook computer, a tablet, or any mobile device with computing ability, or any combination of these computers and/or affiliated components. In some embodiments, client device 130 may be a computer system or mobile computer device that is operated by user 131 who is a customer of service provider system 110. Client device 130 may include any arrangement of one or more computing devices configured to perform one or more operations consistent with disclosed embodiments.

Client device 130 may include one or more processors configured to execute software instructions stored in memory, such as memory 340 included in client device 130. Client device 130 may include software that when executed by a processor (e.g., processor 330) performs known Internet-related communication, content display processes, and financial service-related processes for a user of client device 130. For instance, client device 130 may execute browser or related mobile display software that generates and displays interfaces including content on a display device included in, or in communication with, client device 130. Client device 130 may be a mobile device that executes mobile device applications and/or mobile device communication software that allows client device 130 to communicate with service provider system 110 or authentication system 120 and other components over network 140, and generates and displays content in interfaces via a display device included in client device 130. The disclosed embodiments are not limited to any particular configuration of client device 130.

Client device 130 may be configured with storage that stores one or more operating systems that perform known operating system functions when executed by one or more processors. By way of example, the operating systems may include Microsoft Windows™, Unix™, Linux™, Android™, Apple™ Computers type operating systems, or other types of operating systems. Accordingly, embodiments of the disclosed invention may operate and function with computer systems running any type of operating system. Client device 130 may also include communication software that, when executed by a processor, provides communications with network 140, such as Web browser software, tablet or smart handheld device networking software, etc.

Client device 130 may include a display 310 displaying information. Display 310 may include, for example, liquid crystal displays (LCD), light emitting diode screens (LED), organic light emitting diode screens (OLED), a touch screen, and other known display devices. Display 310 may display various information to user 131. For example, display 310 may display an interactive interface to user 131 enabling user 131 to operate client device 130 to perform certain aspects of the disclosed authentication methods. Display 310 may display touchable or selectable options for user 131 to select, and may receive user selection of options through a touch screen or I/O devices 320.

I/O devices 320 may include one or more devices that allow client device 130 to send and receive information from user 131 or another device. For example, I/O devices 320 may include various input/output devices, such as a keyboard, a mouse-type device, a gesture sensor, an action sensor, a physical button, oratory input, etc. I/O devices 320 may also include one or more communication modules (not shown) for sending and receiving information from other components in system 100 by, for example, establishing wired or wireless connectivity between client device 130 and network 140, service provider system 110, and/or authentication system 120. In some embodiments, client device 130 may include a camera 322 and/or a Global Positioning System (GPS) unit 324. Camera 322 may include any device capable of capturing image data in the form of a single frame still image or a video image. In some embodiments, GPS 324 may enable client device 130 to transmit location data that may be used to assist in the authentication of a user 131 operating client device 130.

Client device 130 may include at least one processor 330, which may be one or more known computing processors, such as those described with respect to processor 210 in FIG. 2. Processor 330 may execute various instructions stored in client device 130 to perform various functions of the disclosed embodiments described in greater detail below.

Client device 130 may include a memory 340, which may be a volatile or non-volatile, magnetic, semiconductor, tape, optical, removable, non-removable, or other type of storage device or tangible (i.e., non-transitory) computer-readable medium. Memory 340 may store one or more programs 350. Programs 350 may include operating systems (not shown) that perform known operating system functions when executed by one or more processors. Disclosed embodiments may operate and function with computer systems running any type of operating system. Client device 130 may be a device that executes mobile applications for performing operations consistent with disclosed embodiments, such as a tablet or mobile device.

In some embodiments, client device 130 may have a financial service application 352 installed thereon, which may enable client device 130 to communicate with service provider system 110, which may be associated with a financial entity, via network 140 and perform aspects of the disclosed authentication methods. For example, client device 130 may connect to service provider system 110 and/or authentication system 120 through use of browser software to access account information and perform certain transactions associated with a financial service account. In some embodiments, the disclosed authentication methods may be initiated in response to user interaction with a financial service application 352 executed on client device 130. Certain aspects of the disclosed authentication methods may be provided as part of financial service application 352 to authenticate user 131 prior to performing certain actions.

In some embodiments, programs 350 or financial service application 352 may include one or more additional software modules including sets of instructions for performing particular aspects of the authentication methods. For example, in some embodiments, programs 350 may include an authentication instance module 354 and an image capture module 356. Authentication instance module 354 may include a set of instructions defining an interface and for selecting a prescribed authentication gesture, as well other operations of the disclosed authentication methods. Image capture module 356 may include a set of instructions for activating and implementing the functionality of camera 322. Image capture module 356 enables the disclosed systems to control operation of camera 322 as part of the exemplary authentication methods, as described in further detail below. In some embodiments, authentication instance module 354 and image capture module 356 may be accessible by financial service application 352 to perform the disclosed authentication methods in association with a mobile or remote banking transaction.

The following processes are directed to various embodiments for authenticating a person, such as user 131, based on image data identifying the person and a prescribed authentication gesture. The following processes may be performed by various aspects and components of system 100 as is apparent from the disclosure.

Figure 4:
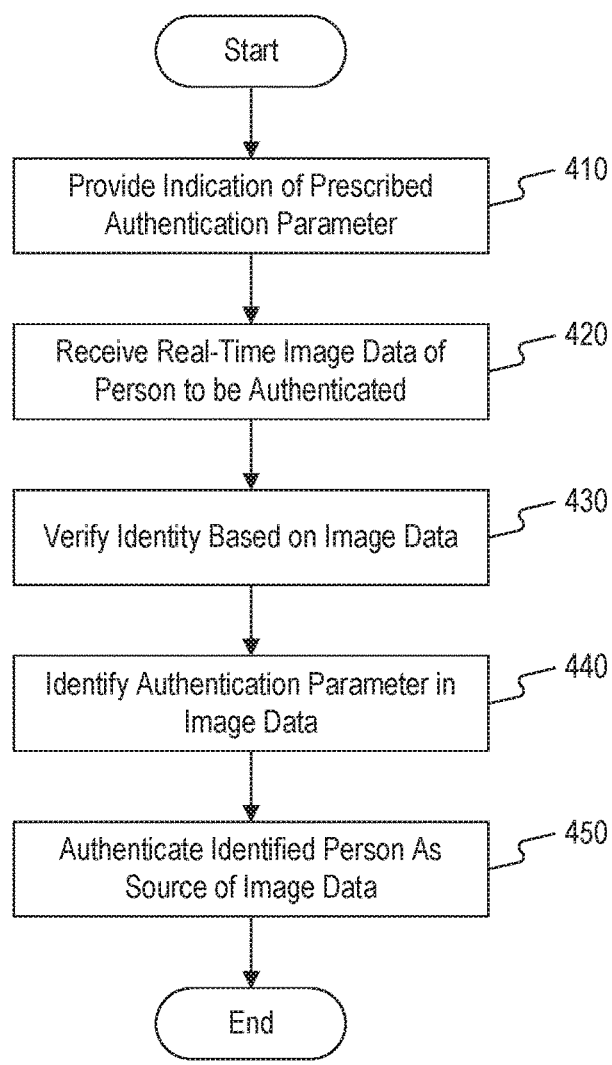
FIG. 4 is a flowchart of an exemplary authentication process, consistent with the disclosed embodiments.

FIG. 4 shows an exemplary authentication process 400 for authenticating a person according to the disclosed embodiments. Process 400 may be executed as part of an authentication instance initiated in response to any situation for authenticating a person. For example, in some embodiments, process 400 may be initiated in response to a user request to perform a transaction, access sensitive data, to enter a building or facility, or any other scenarios where authenticating a person may be desired.

As part of operation 410, an exemplary system, such as computing system 200, may provide an indication of a prescribed authentication parameter defining a requirement for the authentication process. The indication may be provided to a person or other aspects of system 100 according to any particular implementation. For example, in some embodiments, the indication may be provided to an authentication instance module 354 executed on client device 130, which may display the indication to user 131 via display 310. In other embodiments, the indication may be provided to a person using an interface or some other I/O device provided as part of computing system 200. The indication may be provided by an audible or visual output or any other output recognizable by user 131.

In the disclosed embodiments, a prescribed authentication parameter may include any parameter defining a requirement for the authentication process. In some embodiments, the prescribed authentication parameter may include a requirement for authentication in addition to particular biometric information (which itself may be an authentication parameter). The prescribed authentication parameter may be defined in a way such that the parameter may be captured as part of image data along with other biometric information of the person. In some embodiments, the prescribed authentication parameter may correspond to a gesture to be performed by the person to be authenticated that is captured in image data along with a particular biometric. In some embodiments, the biometric information to be captured may be predetermined based on prior registration of biometric information, for example. Thus, in some embodiments, the prescribed authentication parameter may be based on the nature of the biometric information to be captured in image data. For example, in some embodiments, the prescribed authentication parameter may identify or define a gesture to be performed by the person using the person's hands or fingers. Some examples of a hand and finger gesture are described below with respect to FIGS. 6a-6d. In some embodiments, the prescribed authentication gesture may be static, such that the gesture can be captured in image data of a single image. In other embodiments, the prescribed authentication gesture may incorporate motion, such that the gesture may be identified in a video image. The prescribed authentication gesture may define some relationship of both a static gesture along with motion.

Some authentication parameters may incorporate an interaction with a facial feature, so as to require the person to point to their ear, chin, eye, etc. Other possible authentication parameters may incorporate a particular object, such as an identification card, credit card, keys, wallet, or some other readily accessible object to be captured in image data along with a biometric of the person to be authenticated. For example, an authentication parameter may define that the person to be authenticated is to hold up an identification card next to their cheek. If the biometric information to be captured in image data corresponds to a "signature" of hand movement or facial movement, for example, an authentication parameter may define a sequence of letters or words to be spoken or signed using the person's hand. If the biometric information to be captured in image data corresponds to a scan of a person's iris, the authentication parameter may incorporate a sequence of eye movements or blinks that may be captured in image data along with the iris information. The disclosed embodiments are not limited to the above examples. Other authentication parameters are contemplated by the present disclosure.

In some embodiments, the prescribed authentication parameter may be determined or selected from a plurality of possible authentication parameters. In some embodiments, the plurality of possible authentication parameters may be provided as part of a database accessible to components of system 100 (shown or not shown). The prescribed authentication parameter may be dynamically generated or selected in response to initiation of an authentication instance. In some embodiments, the prescribed authentication parameter may be randomly selected from the database of possible authentication parameters. In other embodiments, the prescribed authentication parameter may be based on a formula considering the capabilities of a particular computing system 200 or a history of prescribed authentication parameters and/or other factors. In some embodiments, the authentication parameter is not associated with or particular to the person to be authenticated. As such, the particular aspects or features of the prescribed authentication parameter may be unpredictable to the person to be authenticated such that unauthorized third-parties cannot spoof the prescribed authentication parameter in time to authorize a transaction. In some embodiments, the database of possible authentication parameters may include up to fifty or more distinguishable hand or finger gestures, for example, that may be prescribed during an authentication instance. The number of possible authentication gestures may vary, however, based on the nature of the biometric information and the authentication parameter.

Operation 420 may receive real-time image data of the person to be authenticated. In some embodiments, the real-time image data includes some identification of the prescribed authentication parameter and biometric information of the person to be authenticated. The real-time image data may be captured by camera 322 provided as part of client device 130 or a camera provided as an I/O device 220 as part of computing system 200, In some embodiments, operation 420 may be performed within a predetermined time period after indication of the prescribed authentication parameter is provided to client device 130. Real-time image data may include image data in any form or format capable of being analyzed by computing system 200 to determine an identity of a person and to identify the authentication parameter. In some embodiments, the captured image data may include one or more still images. In other embodiments, the captured image data may include video image data.

Operation 430 may execute one or more image data processing and analysis techniques to verify an identity of the person to be authenticated based on biometric information captured in the image data. The particular image processing techniques implemented may depend on the nature of the received image data, as well as the nature of the biometric information captured in the image data. In some embodiments, the identity of a person may be determined based on facial recognition techniques to identify distinct facial features of a person's face captured in the image data. Other image processing techniques may be used to identify a user's fingerprint, or a pattern of a person's iris, or other biometric information identifiable in the image data. Other biometric information may include uniquely identifying information associated with a user such as a "signature" pattern of facial changes or contortions associated with speech, or a "signature" of hand movements associated with performing certain gestures. For example, a person may be identified based on the unique combination or "signature" of facial changes when speaking certain letters, words, or sounds. People may also be identified based on the unique hand or finger positioning patterns when making certain gestures. The disclosed embodiments may generally determine the identity of a person based on any suitable biometric information that may be captured in image data with a prescribed authentication parameter.

As part of operation 430, an identity of a person may be determined based on a comparison of the analyzed image data with baseline data known to be associated with the person to be authenticated. In some embodiments, for example, aspects of the analyzed image data corresponding to one or more identified facial features or the general appearance of a face may be compared with corresponding data of various facial features previously associated with the person to be authenticated. In some embodiments, a person's identity may be verified based on comparison of the captured image data with one or more previously stored images to determine whether the captured image data corresponds to the person to be authenticated. Other comparison techniques may be used to determine a correlation or degree of similarity between known images or data of a person to be authenticated. In some embodiments, an algorithm may be implemented to develop a confidence score based on a combination of different comparisons or analysis. A person's identity may be verified if the confidence score meets or exceeds a threshold.

Operation 440 may analyze and process the image data to identify one or more authentication parameters captured in the image data. Operation 440 may be implemented using a number of image data processing and analysis techniques, similar to operation 430, to determine whether at least some aspects or features of a prescribed authentication parameter are present in the captured image data. One or more image data processing operations may be implemented to identify whether certain aspects or features of the prescribed authentication parameter are present in the image data. Similar to operation 430, a confidence score may be generated based on a combination of results from one or more image data processing operations. If the confidence score meets or exceeds a predetermined threshold, then computing system 200 may determine that the authentication parameter is present in the captured image data.

Based on the results of operations 430 and 440, computing system 200 may determine, based on the captured image data, whether to authenticate the identified person as the source of the received image data (operation 450). In some embodiments, the confidence score generated in operation 430 and the confidence score generated in operation 440 may be combined to determine whether to authenticate the person as the source of the received image data. Additional aspects of the exemplary authentication methods are described in greater detail below with respect to FIG. 7

In some embodiments, with respect to operations 430 and 440, computing system 200 may display the captured image data to an operator of computing system 200 and receive input associated with the comparison of the captured image data to baseline information, such as an image obtained from a government issued identification card, or other preexisting identifying information.

Figure 5:
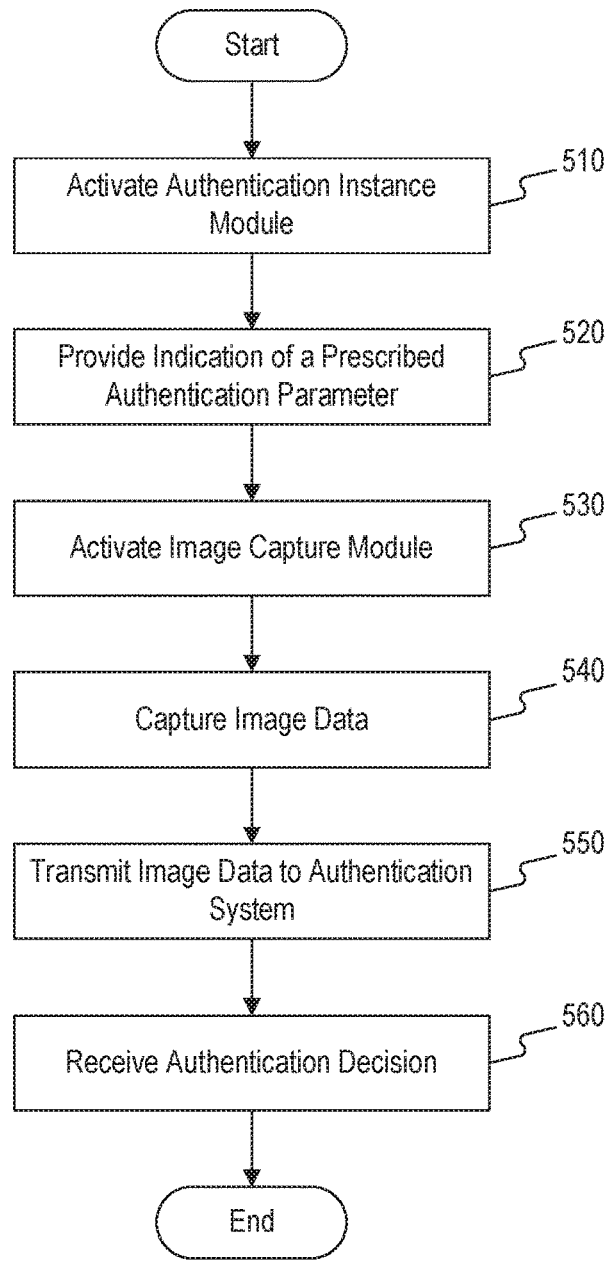
FIG. 5 is a flowchart of an exemplary authentication process, consistent with the disclosed embodiments.

FIG. 5 illustrates another example authentication process 500, similar to process 400, that may be performed by a remote client device 130 operated by user 131. The exemplary operations 500 may be performed by one or more processors executing sets of instructions for controlling the operation of client device 130 as detailed above with respect to FIG. 3.

Process 500 may begin with operation 510 to activate an authentication instance module, such as module 354 described above with respect to FIG. 3. Authentication instance module 354 may be activated in response to a request by user 131 to perform authentication, or it may be activated by one or more other programs, such as financial service app 352 in response to a request to perform a transaction associated with a financial service account, for example. In some embodiments, authentication instance module 354 may be automatically activated in response to a particular interaction with client device 130 or for any number of other contemplated scenarios. Authentication instance module 354 may include a set of instructions to generate a display similar to that shown in FIG. 8, below, in order for a user to complete the disclosed authentication methods.

In some embodiments, authentication instance module 354 may provide at least an indication of a prescribed authentication parameter (operation 520) defining a gesture or other requirement for authentication as similarly described above with respect to operation 410. In some embodiments, the indication may be provided on display 310 of client device 130, as shown for example in FIG. 8, below. The indication may include at least an explanation of the particular prescribed authentication parameter, a pictorial representation of the prescribed authentication parameter, or other information suitable for a person to understand the prescribed authentication parameter. The prescribed authentication parameter may be selected in a random or other manner unpredictable to user 131, as similarly described above with respect to operation 410. In some embodiments, the prescribed authentication parameter may be selected based on information identifying user 131, such as a username, electronic token, or other information associated with user 131. For example, authentication instance module 354, upon activation, may receive or otherwise determine preliminary user information depending on the manner in which the module is activated. In some embodiments, authentication instance module may select or determine the prescribed authentication parameter based on capabilities of the user 131 or a history of prescribed authentication parameters selected for a particular user 131, as may be determined from prior knowledge of user information. In some embodiments, indication of the prescribed authentication parameter may be provided upon activation of authentication instance module without prior user-identifying information. In some embodiments, authentication instance module 354 may receive information identifying a prescribed authentication parameter that is provided to user 131 from service provider system 110 or authentication system 120.

Figure 8:
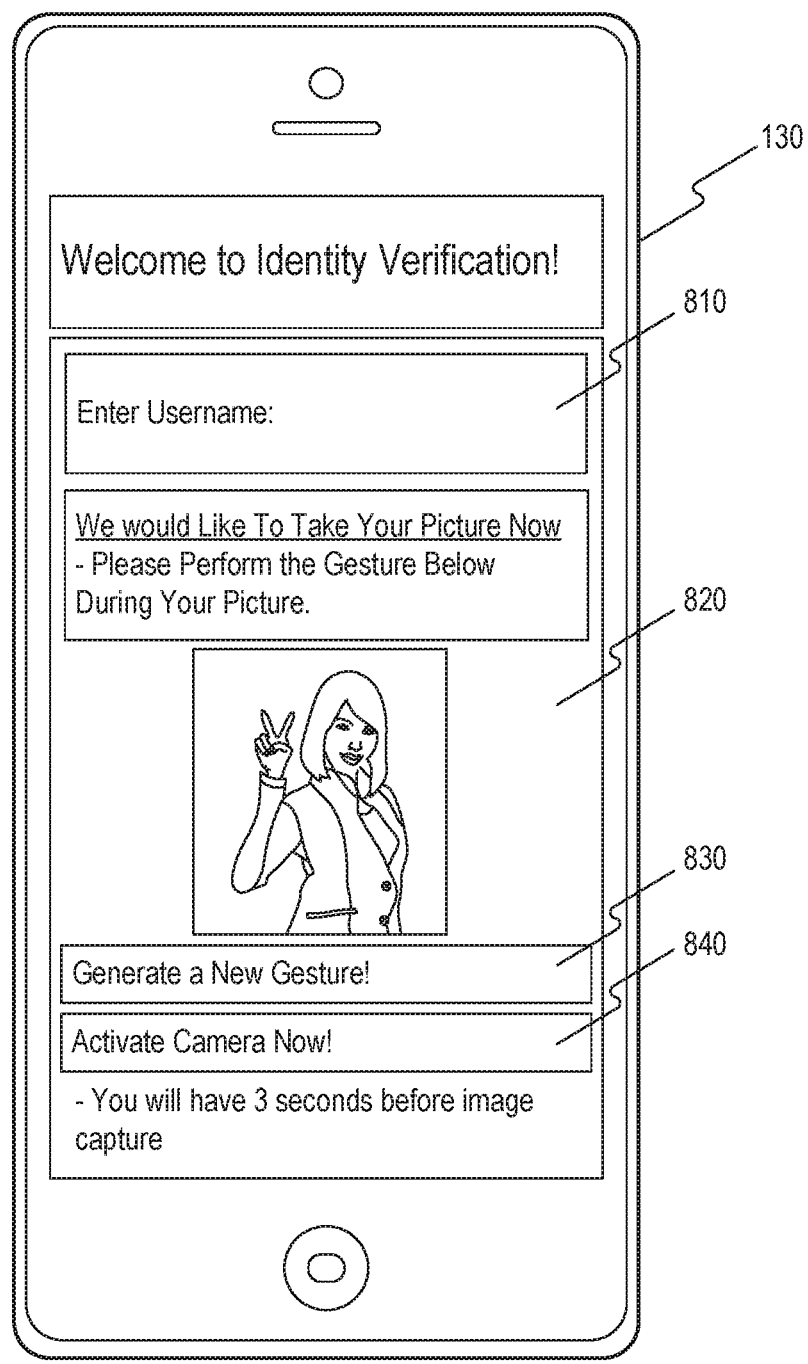
FIG. 8 illustrates an exemplary user device interface for authenticating a user of the client device, consistent with the disclosed embodiments.

As discussed in the example embodiment shown in FIG. 8, an interface generated by authentication instance module 354 may include an input window for receiving a user selection to complete the authentication process. User selection may also be entered using any suitable I/O device 320 provided as part of client device 130. User selection may generally acknowledge acceptance of the prescribed authentication parameter. In some embodiments, user 131 may also be enabled to request a new authentication parameter. In some embodiments, operation 530 may automatically activate an image capture module 356 upon receipt of a user selection or after a predetermined period of time has passed. Moreover, in some embodiments, to minimize the possibility of spoofing the authentication parameter, the authentication parameter may be valid for an authentication instance for only a predetermined period of time. Thus, in some embodiments, the prescribed authentication parameter may change if user selection to continue the process is not received within a predetermined period of time, such as 15 seconds, for example.

Image capture module 356, upon activation, may automatically control operation and functionality of a camera 322 provided as part of client device 130 or otherwise connected thereto. For example, upon activation of image capture module 356, the client device 130 may be placed in image capture ready mode to enable user 131 to capture image data of himself according to the prescribed authentication parameter. Camera 322 may capture image data (operation 540) upon additional user input based on normal operation of camera 322, for example. Alternatively, in some embodiments, image capture module 356 may be configured to automatically capture image data of user 131 after a predetermined period of time once the image capture module is activated. For example, once image capture module 356 is activated, user 131 may have three or more seconds before image capture begins. In some embodiments, client device 131 may provide an output to the user, such as a blinking light, or other indication to notify user 131 that image capture has begun or is about to begin. As described throughout this disclosure, image data may be captured in the form of a single image or as a video image. Thus, image capture module 356 may be configured to operate camera 322 in order to capture suitable image data based on the prescribed authentication parameter.

In some embodiments, image capture module 356 may be configured to determine whether a suitable image has been captured based on preliminary image processing techniques, for example. One such technique may determine an overall pixel value to identify if the image is too bright or too dark, for example. Other preliminary processing techniques may be used to determine whether suitable image data has been captured. Once suitable image data has been captured by camera 322, authentication instance module 354 (or image capture module 356) may transmit the image data to an authentication system, such as authentication system 120 or service provider system 110 (operation 550). In some embodiments, captured image data may be sent to the authentication system 120 over network 140. In some embodiments, the captured image data may be sent automatically, by authentication instance module 354, for example, once captured image data is received from image capture module 356. The image data may be transmitted as part of an authentication request message including other information that may be used as part of the authentication process. For example, in some embodiments, a username or other information identifying user 131 such as an account number, etc. may be transmitted along with the captured image data as part of an authentication request message. The authentication request message may include an identifier of the prescribed authentication parameter.

In some embodiments, additional information, such as location information, may be transmitted as part of the authentication request message. For example, location information may be received from GPS module 324 to identify a location of the user when the image data was captured. Such location information may include detailed location information from which it may be determined whether the user 131 was indoors or outside. Other information regarding the location that may also be received include sample terrain etc. In some embodiments, the location information may be used to determine the weather or the local time of day or any other information that the exemplary authentication system may use to verify authenticity of the captured image data. For example, in some embodiments, the authentication system may be able to determine whether received image data captured outside corresponds to the nature or conditions associated with the received location information at that time. Other determinations based on a comparison of the received image data and location information may be implemented in the disclosed embodiments.

Figure 7:
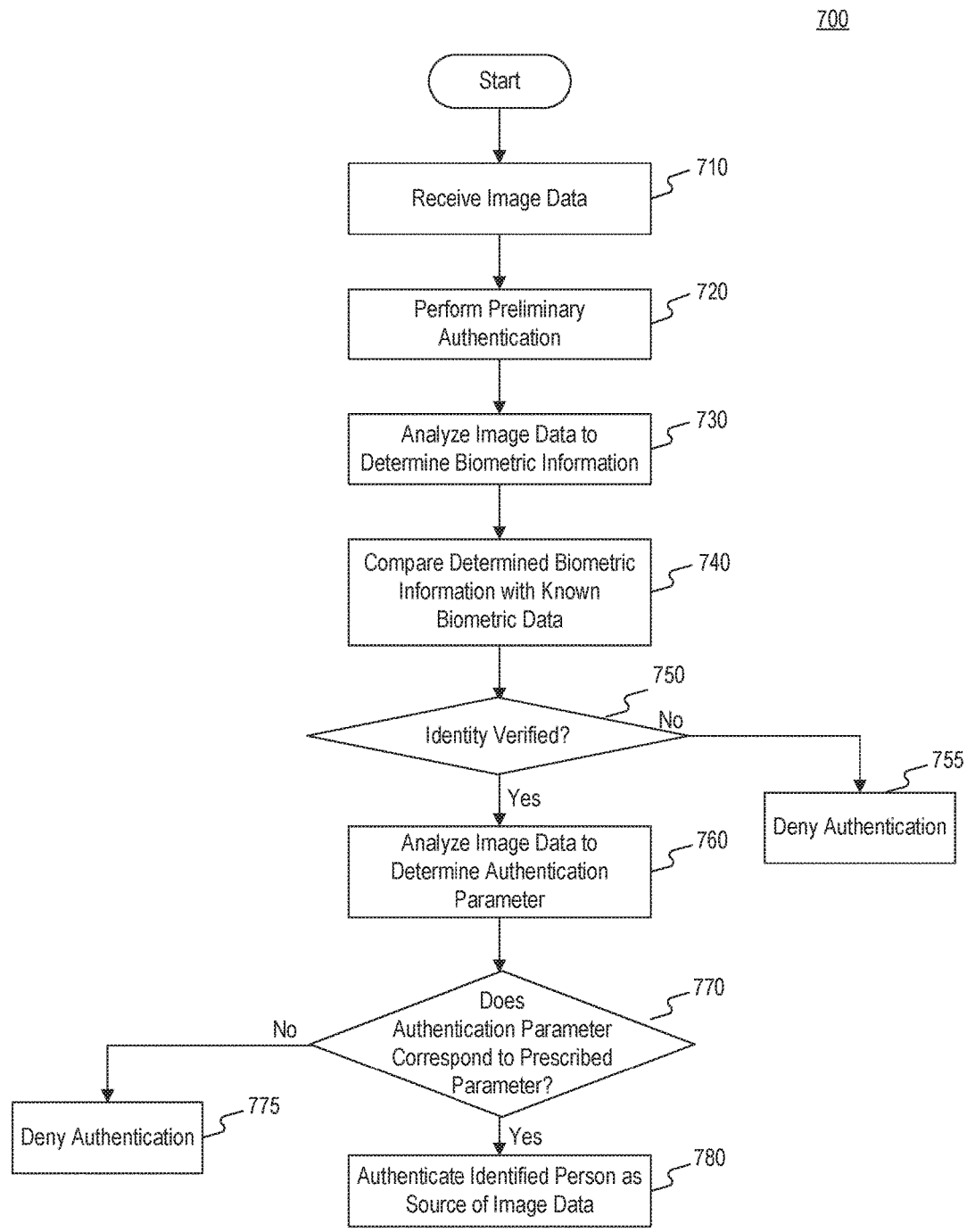
FIG. 7 is a flowchart of an exemplary authentication process, consistent with the disclosed embodiments.

The determination as to whether to authenticate user 131 based at least in part on the captured image data may be performed by authentication system 120 using advanced image processing techniques as similarly described above with respect to operations 430-450, and as described in additional detail below with respect to FIG. 7. Consistent with the present disclosure, authentication system 120 may be provided as part of service provider system 110 or other systems desiring to authenticate a user 131.

Once an authentication decision has been made, client device 130 may receive indication of the authentication decision in operation 560. Indication of the authorization may include a positive indication that the user 131 has been authenticated. In other embodiments, depending on the manner in which authentication instance module 354 was activated, user 131 may automatically be presented with a display enabling a transaction, or access to information or other action that prompted activation of authentication instance module 354.

FIGS. 6a-6d illustrate examples of a prescribed authentication parameter according to some embodiments. As described above, an authentication parameter may generally define some requirement to be included in the captured image data in addition to biometric information in order to authenticate a person. In some embodiments, the captured image data may include at least some aspect of biometric information of the user. In the embodiments shown in FIGS. 6a-6d, biometric information of the user corresponds to one or more facial features that in combination serve to uniquely identify the person to be authenticated. As such, consistent with the disclosed embodiments, a person's identity may be determined or verified in part based on the outcome of facial recognition processes performed on captured image data. As shown in FIGS. 6a-6d, some embodiments prescribing an authentication parameter to be captured in association with biometric information corresponding to a person's facial features may include one or more hand or finger gestures.

Figure 6A:
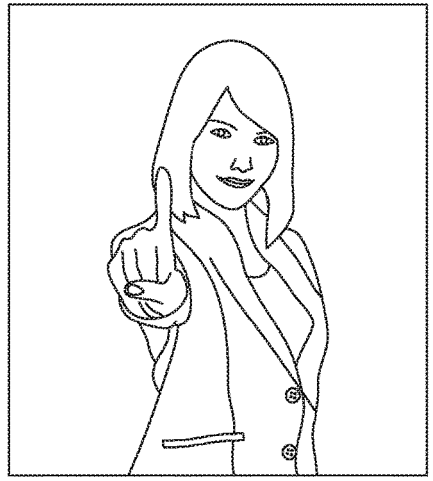
FIGS. 6a-6d illustrate exemplary authentication parameters, consistent with the disclosed embodiments.

As shown in FIG. 6a, an example authentication parameter may define the formation of a person's hand in a pointing gesture using an index finger, as shown. In some embodiments, the authentication parameter may be particularly defined to specifically indicate the pointing gesture of the user's index finger of the right hand, for example. Additionally, in some embodiments, the authentication parameter may define that the user's hand is to be positioned in front of the user's body with a straight arm as shown in FIG. 6a. In some embodiments, the prescribed authentication parameter may even define the position of the user's head or the positioning of the user's body. Any combination of identifiable characteristics may be included as part of the prescribed authentication parameter. In some embodiments, a user 131 may be requested to emulate the prescribed authentication parameter as closely as possible.

Figure 6B:
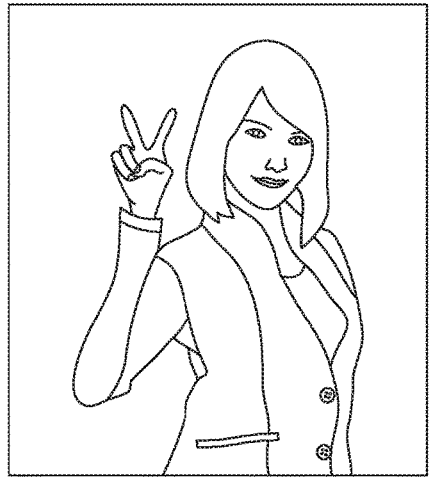
Figure 6C:
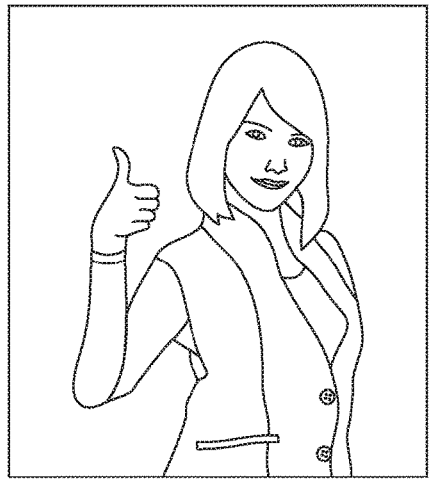

FIGS. 6b and 6c illustrate other example authentication parameters similarly defining the formation of the user's hand to hold up two fingers spaced apart (as shown in FIG. 6b) or in a "thumbs up" formation (FIG. 6c), As shown in these examples, an authentication parameter may also define that the user's hand is to be positioned to the side of the user with a bent arm, in contrast to the example shown in FIG. 6a.

Figure 6D:
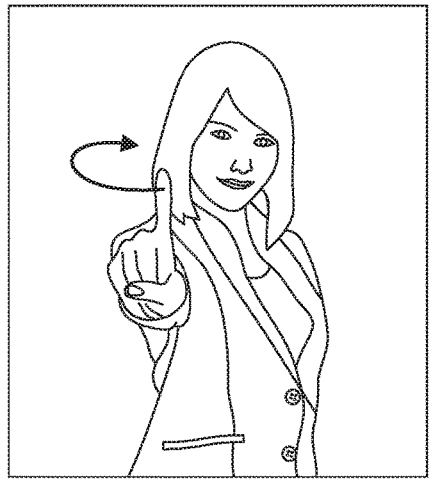

FIG. 6d illustrates another example authentication parameter defining the formation of the user's hand similar to that shown in FIG. 6a, as well as a motion to be performed using the hand gesture. For example, the authentication parameter may define a circular motion in a counter-clockwise direction from the user's perspective.

The above examples are exemplary only. Other hand gestures may be implemented in addition to or alternative to the above. As described above, the total number of possible authentication parameters may include up to fifty or more possible gestures or combinations of gestures and some prescribed motion, etc. Additionally, the disclosed embodiments are not limited to the illustrated combination of biometric information and a similar hand gesture. Numerous other combinations of biometric information and authentication parameters are contemplated by the present disclosure.

As described with respect to FIG. 4, the disclosed embodiments may implement various image data processing techniques to authenticate a person based on the analysis of captured image data. FIG. 7 illustrates an exemplary authentication process 700 that may be implemented by authentication system 120, for example, to authenticate a person or user 131 according to the disclosed embodiments.

Authentication process 700 may begin when authentication system 120 receives captured image data (operation 710). The captured image data may be received from client device 130, or service provider system 110 or other computing system 200 as part of an authentication request message, for example. In some embodiments, the captured image data may be received from a remote computing system over a network, such as network 140.

Process 700 may include an initial operation to perform preliminary authentication of the received image data (operation 720). Preliminary authentication of the received image data may be based on timestamp information received in the image data, as may be automatically appended to the image data by image capture module 356, for example. Other preliminary authentication techniques may examine other metadata of the authentication request or image data to identify potentially fraudulent or spoofed authentication requests. In some embodiments, a preliminary authentication process may compare the currently received image data with a plurality of prior images received in association with a particular user to identify whether the current image data includes a duplicate image. Other preliminary authentication techniques may be performed based on received location information, for example, to determine whether the received image data is consistent with characteristics associated with the location information. Other preliminary authentication operations are contemplated by the present disclosure.

In operation 730, authentication system 120 may analyze the captured image data to identify or determine the biometric information contained in the image data. Authentication system 120 may perform any one or more image processing techniques for analyzing the particular biometric information contained in the captured image data. A nature of the biometric information may be determined in advance based on prior information of the particular authentication method, or it may be determined based on identifying metadata contained in the authentication request or the image data, for example. In the example shown in FIG. 6a, the biometric information corresponds to a combination of facial features of a person. As part of operation 730, authentication system 120 may analyze the received image data according to one or more processing techniques to identify one or more facial features of the person captured in the image data.

In operation 740, authentication system 120 may compare the analyzed biometric information with other stored or accessible biometric information to identify the person in the captured image data. In some embodiments, a received authentication request message includes an identifier associated with the person to be authenticated. In these embodiments, authentication system 120 may access biometric information associated with the identifier of the person to be authenticated. One or more comparisons between the analyzed biometric information in the captured image data and the stored or accessible biometric information of the person to be authenticated may be performed to evaluate whether the information sufficiently matches in order to authenticate the person. With respect to the example in FIG. 6a, for example, one or more comparisons may be made to determine a match or the similarity between a number of different facial features, such as the shape of the person's face, her eyes, her nose, the relative proportion and positioning of the facial features, skin tone, etc. Numerous facial characteristics may be considered in the comparison.

In operation 750, authentication system 120 may determine whether the identity of the person in the analyzed image data can be verified or authenticated based on the one or more comparisons of operation 740. The determination may be based on a confidence score associated with one or more comparisons of the image data and known biometric information. For example, with respect to the example for FIG. 6a described above, a confidence score may be associated with each comparison of the particular facial features. In some embodiments, the plurality of confidence scores may be summed and evaluated with a threshold score to determine whether the person's identity can be authenticated. In other embodiments, the score of each comparison may be evaluated based on a threshold score to determine a sufficient match for each compared facial feature. The determination to authenticate the person's identity may be based on whether a sufficient number of "matches" have been identified in the comparisons. A number of other factors may also be used to influence the confidence score or other parameters for determining whether to authenticate the identity of the person in the captured image data. The above examples are not limiting. Moreover, the nature of a comparison may depend on the nature of the biometric information to be verified. As such, alternative comparison and evaluation techniques may be implemented in other embodiments.

If authentication system 120 determines that the person's identity cannot be verified or authenticated (No: operation 750), then authentication system 120 may deny authentication for the person and end authentication process 700 (operation 755). Alternatively, if authentication system is able to verify or authenticate the person's identity based on the image data (Yes: operation 750), then authentication system 120 may analyze the image data to identify and determine an authentication parameter present in the image data (operation 760).

As part of operation 760, authentication system 120 may perform one or more image processing techniques to identify the presence of a possible authentication parameter in the analyzed image data. In some embodiments, the one or more image processing techniques are based on the nature of the prescribed authentication parameter. Thus, authentication system 120 may analyze the captured image data to identify whether aspects or features of the prescribed authentication parameter are present in the captured image. For example, with respect to the example shown in FIG. 6d, authentication system 120 may analyze the image data to identify at least portions of a person's hand. Other image data analysis techniques may be implemented to determine which of the person's hands is captured in the image data, a formation of the person's hand, a positioning of the hand relative to the person's face or body, motion of the hand in video image data, and other characteristics of the prescribed authentication parameter. Other image analysis techniques may be used depending on the defined characteristics of the prescribed authentication parameter.

As part of operation 770, authentication system 120 may determine whether the identified possible authentication parameters are sufficiently similar to the prescribed authentication parameter in order to authenticate the person as the source of the image data. Similar to the above disclosure with respect to operation 740, a confidence score may be associated with each of the one or more comparisons based on the similarity of the identified possible authentication parameter in the captured image data and characteristics of the prescribed authentication parameter. If a confidence score or other similar score meets or exceeds a predetermined threshold, the authentication system 120 may determine that the person is to be authenticated (Yes: operation 770). Alternatively, authentication system 120 may determine that the person cannot be authenticated (No: operation 770). Based, at least in part, on the determination in operation 770, authentication system 120 may deny authentication (operation 775) or authenticate the identified person as the source of the image data (operation 780). In some embodiments, an authentication decision may be sent to a client device 130 or service provider system 110 or other system that submitted the authentication request.

The above disclosure of authentication process 700, according to some embodiments, may include additional or alternative operations based in part on the nature of the biometric information and a prescribed authentication parameter. As contemplated by the disclosure, any number or combination of suitable image processing techniques may be implemented to authenticate a user based on an analysis of captured image data. Additionally, while process 700 is described as being performed by authentication system 120, in some embodiments, process 700 may be performed by a client device 130 or a computing system 200 provided as part of another system.

User interaction in the above examples may be enabled using an interface of an application developed for download to mobile communications and computing devices, e.g., laptops, mobile computers, tablet computers, smart phones, etc. The applications may be made available for download by the user either directly from the device, through a website, or through a dedicated application store. An exemplary interface illustrating certain aspects of the disclosed methods is shown in FIG. 8.

FIG. 8 depicts an interface, according to some embodiments, that may be used to display an indication of a prescribed authentication parameter on client device 130 as part of an authentication instance, as similarly described with respect to operation 520 shown in FIG. 5. The interface may be provided on a client device 130, which according to the illustrated embodiment, may be a smartphone. The interface shown may be part of a financial service application 352, or may alternatively be part of authentication instance module 354 accessible to one or more other programs. An exemplary interface may include a plurality of windows or regions, some of which display information to the user of client device 130 and others and enable user 131 to provide an input.

As shown in FIG. 8, a first region 810 of an interface for client device 130 may include a window displaying or requesting a user 131 to enter a username. As described in the above embodiments, a username (or other identifier) may serve as an identifier to facilitate certain aspects of the disclosed authentication methods, such as to identify a set of known biometric data of the user for use in a comparison with captured image data. A second region 820 may display or provide an indication to the user 131 of a prescribed authentication parameter as similarly described in operation 520 of FIG. 5, and as shown in FIG. 6b. Region 820 may include a sample image of a person visually depicting the prescribed authentication parameter. In some embodiments, an exemplary interface may include an option for user 131 to generate a new authentication parameter or a new gesture by selecting region 830, for example. This feature may be helpful if user 131 is unable to perform or doesn't understand the illustrated gesture for example. Another region 840 may be provided to automatically activate a camera of the client device 130 to capture an image of user 131 performing the authentication parameter. For example, operation 530 described above with respect to FIG. 5 may be executed upon selection of region 840. As shown, additional information may be displayed to indicate to the user 131 an amount of time before which image capture may begin once region 840 is selected. In some embodiments, other windows or regions may be added, whereas some of the illustrated regions may be deleted. Additionally, an exemplary interface may include one or more drop down windows or other features to provide additional information or options to user 131. For example, in some embodiments, a user 131 may be able to select region 820 to learn more about the defined prescribed authentication parameter.

The above disclosure associated with an exemplary interface is presented by way of example only. The features and functionality of the disclosed embodiments are not limited or defined by the functionality suggested by the illustrated interface.

The above described processes may be implemented as a computer program or application or as a plugin module or sub component of another application. Some of the described processes may be executed by a computing system 200 of service provider system 110, authentication system 120, client device 130 or other system components that may be provided as part of system 100. The described techniques may be varied and are not limited to the examples or descriptions provided.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of operations may be modified, and operations may be added or deleted. For example, in some embodiments, authentication operations 430 and 440, as well as 730, 740, 760, and 770 may be performed as serial (as shown) or parallel operations. Other modifications are also contemplated.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language used in the claims and not limited to examples described in the present specification, which are non-exclusive. For example, aspects of the disclosed embodiments are described as being associated with data stored in memory, and one skilled in the art will appreciate that these aspects can be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for authenticating a user of a computing device, the system comprising:
    one or more memory devices storing instructions; and
    one or more processors configured to execute the instructions to:
        provide, to the computing device, an indication of a prescribed authentication parameter configured to be displayed to the user via the computing device, the prescribed authentication parameter comprising an indication of a gesture to be performed by the user, the gesture comprising presentation of at least an inanimate physical object;
        receive image data comprising an image of the user captured using an image sensor of the computing device;
        verify an identity of the user based on facial recognition analysis of the received image data;
        determine whether the received image data comprises a feature corresponding to the prescribed authentication parameter; and
        authenticate the user based at least in part on whether the received image data comprises the feature.

2. The system of claim 1, wherein the inanimate physical object to be presented by the user is selected from a plurality of predetermined objects.

3. The system of claim 1, wherein the gesture to be performed by the user further comprises holding the object in a defined location.

4. The system of claim 1, wherein the indication of a prescribed authentication parameter is provided in response to receiving, from the computing device, a user-initiated request to perform a transaction with the computing device, the one or more processors being configured to execute the instructions to authenticate the user to perform the transaction based at least in part on whether the received image data includes the feature corresponding to the prescribed authentication parameter.

5. A device operated by a user, the device comprising:
    one or more memory devices storing instructions; and
    one or more processors configured to execute the instructions to:
        provide, on a display of the device, an indication of a prescribed authentication parameter, the prescribed authentication parameter comprising an indication of a gesture to be performed by the user, the gesture comprising a presentation of at least one inanimate physical object;
        receive a command via an interface of the device, from a user operating the device, to initiate an image capture operation;
        activate an image capture module in response to the command, wherein the image capture module is configured to control an image capture device associated with the device;
        capture image data of the user via the image capture device;
        transmit at least a portion of the captured image data to an authentication system; and
        receive indication of an authentication decision from the authentication system, wherein the authentication decision is based at least in part on whether the received image data identifies the user and comprises a feature corresponding to the prescribed authentication parameter.

6. The device of claim 5, wherein the gesture to be performed by the user further comprises a defined motion of the at least one object by the user.

7. The device of claim 5, wherein the inanimate physical object to be presented by the user is selected from a plurality of predetermined objects.

8. The device of claim 5, wherein the indication of the prescribed authentication parameter is provided on the display of the device responsive to a user-initiated request to perform a transaction with the device.

9. The device of claim 5, wherein the authentication system is remotely located from the device, the one or more processors configured to execute the instructions to receive the prescribed authentication parameter from the authentication system over a communication network.

10. A computer-implemented method for authenticating a user of a computing device, the method comprising:
    providing, to the computing device, an indication of a prescribed authentication parameter configured to be displayed to the user, the prescribed authentication parameter comprising an indication of a gesture to be performed by the user, the gesture comprising a presentation of at least one inanimate physical object;
    receiving image data comprising an image of the user captured using an image sensor of the computing device;
    verifying an identity of the user based on facial recognition analysis of the received image data;
    determining whether the received image data comprises a feature corresponding to the prescribed authentication parameter; and authenticating the user based at least in part on whether the received image data comprises the feature;

wherein the method is performed by one or more processors.

11. The method of claim 10, wherein the indication of a prescribed authentication parameter is provided to the computing device in response to an authentication request received from the computing device.

12. The method of claim 11, wherein the authentication request is received from the computing device as part of a user-initiated request to perform a transaction with the computing device.

13. The method of claim 10, wherein the inanimate physical object to be presented by the user is selected from a plurality of predetermined objects.

14. The method of claim 10, wherein the gesture to be performed by the user further comprises a defined motion of the at least one object by the user.

15. The method of claim 10, wherein the inanimate physical object includes information identifying the user.

16. The method of claim 10, wherein determining the identity of the user based on an analysis of the received image data further comprises displaying the received image data and receiving an input associated with baseline information associated with the user.

17. The method of claim 10, wherein the computing device is a remote computing device, and the indication of the prescribed authentication parameter is provided over a communications network to the remote computing device.

18. The method of claim 10, wherein the computing device is a remote computing device, and the indication of the prescribed authentication parameter is provided to the remote computing device over a communication network.

* * * * *